(12) United States Patent
Lee et al.

(10) Patent No.: US 7,366,479 B2
(45) Date of Patent: Apr. 29, 2008

(54) MOBILE COMMUNICATION TERMINAL HAVING AN EXTERNAL ANTENNA

(75) Inventors: Ju-Hyung Lee, Suwon-si (KR); Wan-Jin Choi, Suwon-si (KR); Joung-Sub Shin, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 638 days.

(21) Appl. No.: 10/946,806

(22) Filed: Sep. 22, 2004

(65) Prior Publication Data

US 2005/0153651 A1 Jul. 14, 2005

(30) Foreign Application Priority Data

Jan. 12, 2004 (KR) ...................... 10-2004-0002033

(51) Int. Cl.
*H04B 1/44* (2006.01)
(52) U.S. Cl. ...................... 455/78; 455/553.1; 343/702
(58) Field of Classification Search ...................... None
See application file for complete search history.

(56) References Cited

U.S. PATENT DOCUMENTS 5,628,049 A * 5/1997 Suemitsu .................... 455/11.1
5,768,691 A * 6/1998 Matero et al. ................ 455/78
6,100,847 A * 8/2000 Sointula ...................... 343/702
2005/0277387 A1* 12/2005 Kojima et al. ................ 455/78

* cited by examiner

*Primary Examiner*—Thanh Cong Le
(74) *Attorney, Agent, or Firm*—The Farrell Law Firm, PC

(57) ABSTRACT

Disclosed is a mobile communication terminal including a separate antenna for receiving multimedia public broadcasting signals. The mobile communication terminal has a sender/receiver antenna, a diversity antenna for performing a diversity function, a diplexer connected to the sender/receiver antenna for outputting signals from the sender/receiver antenna, a satellite antenna detachably mounted on the mobile communication terminal for receiving multimedia public broadcasting signals or satellite broadcasting signals. A receiving/transmitting signal processing section is provided for processing signals transmitted from the sender/receiver antenna, the diversity antenna and the satellite antenna. A switch section is positioned between the diversity antenna and the receiving/transmitting signal processing section to connect the diversity antenna to the receiving/transmitting signal processing section when the satellite antenna is not installed on the mobile communication terminal and to connect the satellite antenna to the receiving/transmitting signal processing section when the satellite antenna is installed on the mobile communication terminal.

12 Claims, 3 Drawing Sheets

MOBILE COMMUNICATION TERMINAL HAVING AN EXTERNAL ANTENNA

PRIORITY

This application claims priority to an application entitled "Mobile Communication Terminal Having External Antenna" filed in the Korean Intellectual Property Office on Jan. 12, 2004 and assigned Serial No. 2004-2033, the contents of which are hereby incorporated by reference.

BACKGROUND OF THE INVENTION

1. Field of the Invention

The present invention relates to a mobile communication terminal, and more particularly to an external antenna of a mobile communication terminal for providing a user with a multimedia broadcasting service.

2. Description of the Related Art

Generally, mobile communication terminals have call-receiving and call-transmitting functions. Recently, as portability and convenience of use of mobile communication terminals has improved, mobile communication terminals have been equipped with various functions for receiving entertainment services in addition to providing an original communication function. Such an entertainment service available for the mobile communication terminals is a multimedia public broadcasting service. In order to provide a user with such multimedia public broadcasting service, a mobile communication terminal must be equipped with a multimedia display function and an antenna capable of receiving signals of the multimedia public broadcasting service.

As generally known in the art, multimedia public broadcasting services are provided with a frequency band of 54 MHz to 805 MHz. For a satellite Digital Multimedia Broadcasting (DMB) service, a high frequency band of 2605 MHz to 2655 MHz is used. In addition, a frequency band used in personal mobile communication is about 830 MHz to 890 MHz or 1750 MHz to 1870 MHz. That is, the frequency band used for multimedia public broadcasting services is lower than the frequency band used for personal mobile communication. Since the frequency band of multimedia public broadcasting services is low, a wavelength of a signal of multimedia public broadcasting services is long. Accordingly, in order to receive the multimedia public broadcasting service signal, the antenna of the mobile communication terminal must be longer. For this reason, an antenna for receiving the signal of the multimedia public broadcasting service has to be of a length that is relatively longer than the length of an antenna for a general mobile communication terminal. Thus, if the antenna for receiving the multimedia public broadcasting service is accommodated in the mobile communication terminal, the size of the mobile communication terminal must be enlarged, and it becomes inconvenient to carry the mobile communication terminal.

Mobile communication terminals can receive satellite DMB signals through a general call receiving/transmitting antenna if the satellite DMB signals are indirectly transmitted to the mobile communication terminal by way of a transponder. In this case, however, signal sensitivity of the satellite DMB signals may be weakened and the satellite DMB signals cannot be transmitted to the mobile communication terminal in an area where the transponder is not installed. In addition, even if the mobile communication terminal adopts a frequency band similar to the frequency band of the satellite DMB service, which is higher than a frequency band applied to a conventional communication method, an antenna of the mobile communication terminal should be oriented in a direction of the satellite in order to obtain a high gain. Thus, it is advantageous to install the antenna at an external portion of the mobile communication terminal in order to obtain high performance from the mobile communication terminal.

Therefore, it is necessary to provide an antenna for receiving multimedia public broadcasting services and/or satellite broadcasting services by covering a wide range of frequency bands, greater than frequency bands covered by a conventional antenna of a mobile communication terminal.

SUMMARY OF THE INVENTION

Accordingly, the present invention has been made to solve the above-mentioned problems occurring in the prior art, and an object of the present invention is to provide a mobile communication terminal having an antenna for receiving multimedia public broadcasting services and/or satellite broadcasting services.

Another object of the present invention is to provide a mobile communication terminal capable of detachably mounting thereon one or more antennas for receiving multimedia public broadcasting service and/or satellite broadcasting services.

To accomplish the above objects, there is provided a mobile communication terminal that includes a sender/receiver antenna, a diversity antenna for performing a diversity function, a diplexer connected to the sender/receiver antenna for outputting signals transmitted thereto from the sender/receiver antenna by discriminating the signals based on frequency bands thereof, a satellite antenna detachably mounted on the mobile communication terminal in order to receive multimedia public broadcasting signals or satellite broadcasting signals, a receiving/transmitting signal processing section for processing signals transmitted thereto from the sender/receiver antenna, the diversity antenna and the satellite antenna, and a switch section positioned between the diversity antenna and the receiving/transmitting signal processing section so as to connect the diversity antenna to the receiving/transmitting signal processing section if the satellite antenna is not installed on the mobile communication terminal and so as to connect the satellite antenna to the receiving/transmitting signal processing section if the satellite antenna is installed on the mobile communication terminal.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENTS

Figure 1:
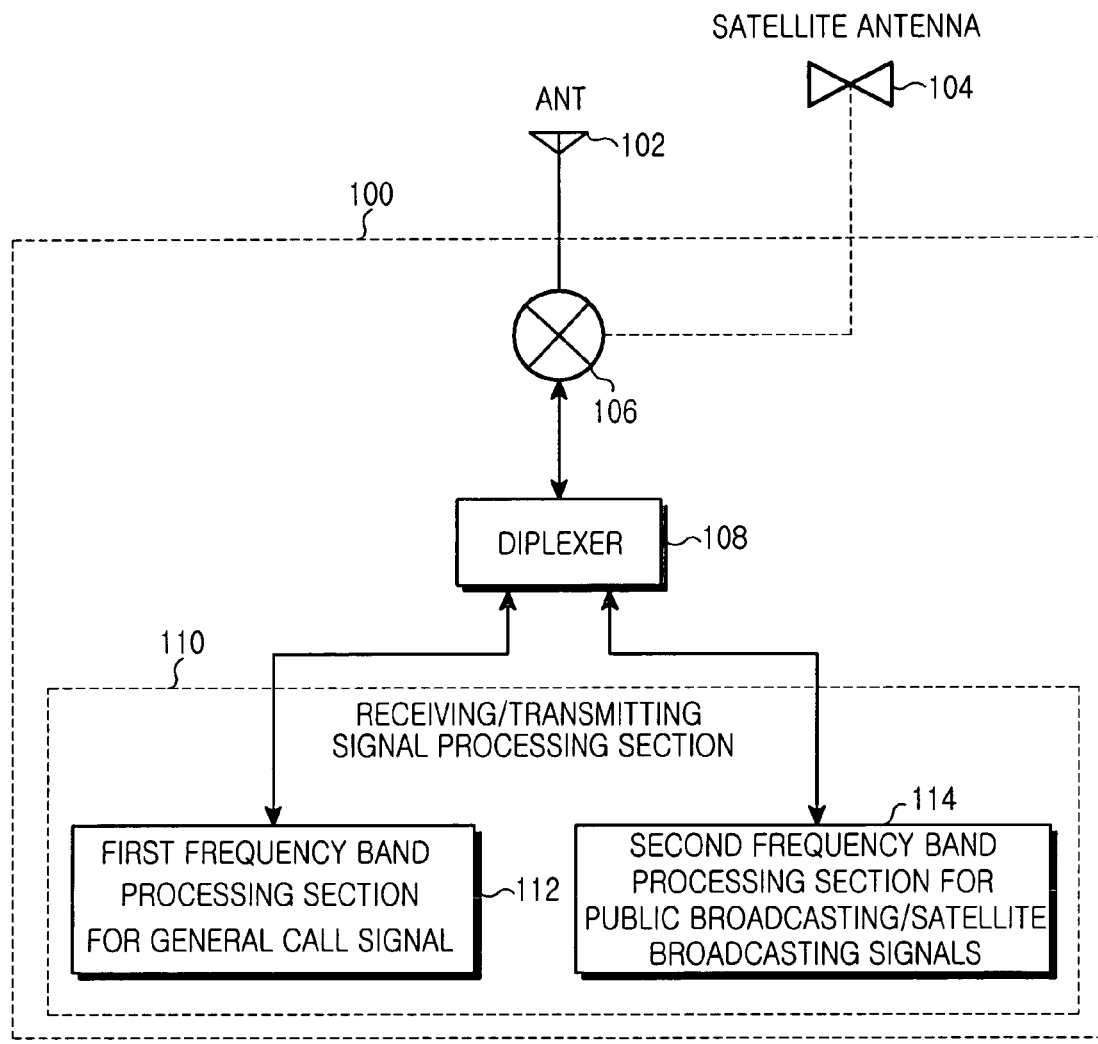
FIG. 1 shows an external antenna mounted on a mobile communication terminal according to a first embodiment of the present invention.

Hereinafter, preferred embodiments of the present invention will be described with reference to the accompanying drawings. In the following description of the present invention, the same reference numerals are used to designate the same or similar components. A detailed description of known functions and configurations incorporated herein is omitted to avoid making the subject matter of the present invention unclear.

FIG. 1 shows an external antenna mounted on a mobile communication terminal 100 according to a first embodiment of the present invention. The mobile communication terminal of the present invention is a dual band type mobile communication terminal capable of operating two different systems. That is, in FIGS. 1 to 3, a first band RF processing section is a frequency band processing section provided for general call signals, and a second band RF processing section is a frequency band processing section provided for public broadcasting signals and satellite broadcasting signals.

Figure 2:
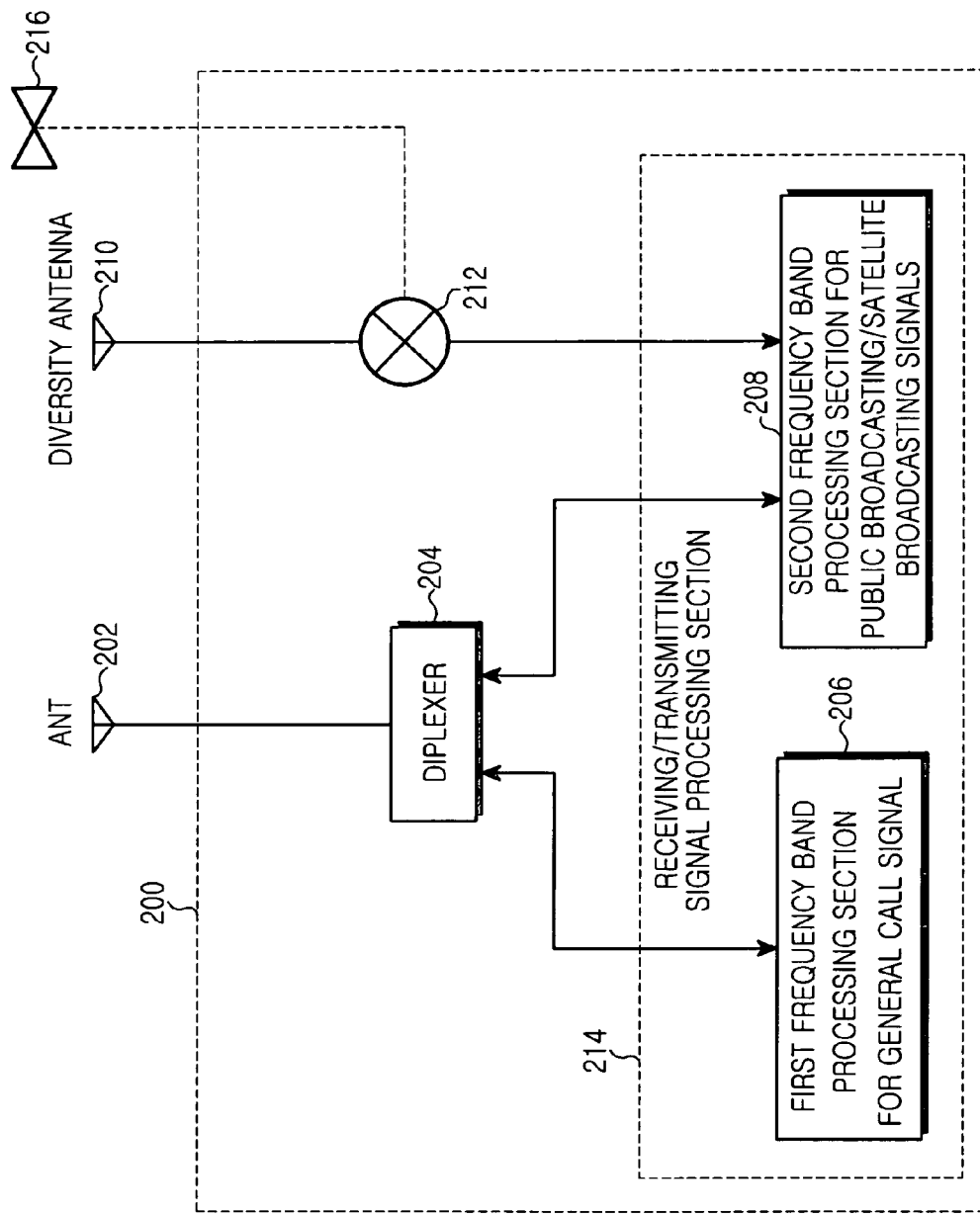
FIG. 2 shows an external antenna mounted on a mobile communication terminal according to a second embodiment of the present invention.
Figure 3:
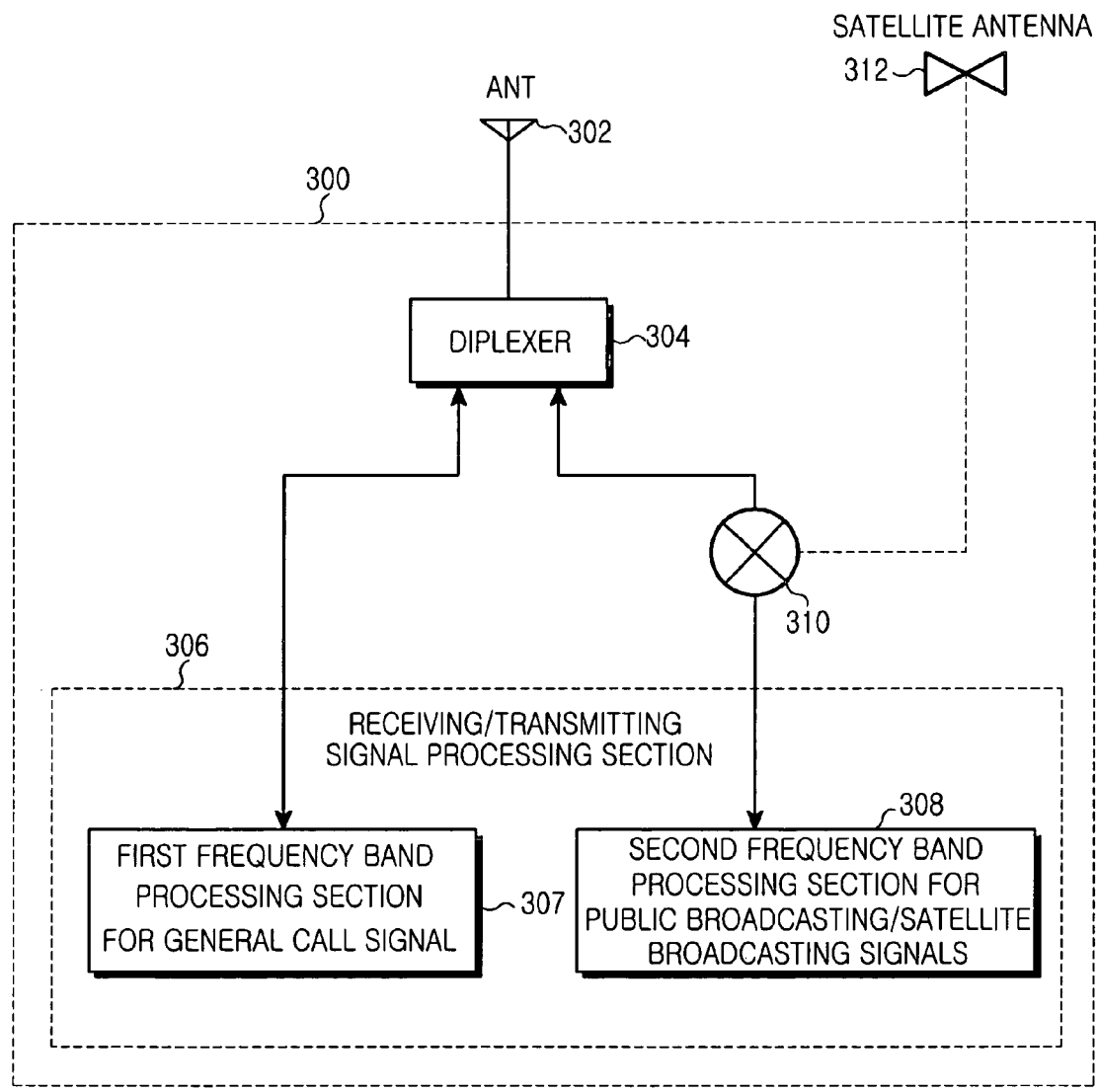
FIG. 3 shows an external antenna mounted on a mobile communication terminal according to a third embodiment of the present invention.

Each of sender/receiver antennas 102, 202, and 302 for receiving/transmitting call signals shown in FIGS. 1 to 3 can receive not only general call signals, but can also receive broadcasting signals if the broadcasting signals are of sufficient strength. However, the above sender/receiver antennas 102, 202, and 302 have performance inferior to performance of the external antenna according the present invention. Generally, a mobile communication terminal providing a user with a digital multimedia broadcasting service, such as a satellite DMB terminal, includes a first call processing section for receiving and processing general call signals and a second call processing section for receiving and processing digital multimedia broadcasting signals. Since the present invention relates to an antenna, the first and second call processing sections, which process call signals transmitted thereto through the antenna, are not separately described. The first and second call processing sections are preferably provided as part of receiving/transmitting signal processing section 110, 214 and 306.

As shown in FIG. 1, the mobile communication terminal 100 includes the sender/receiver antenna 102 (hereinafter, simply referred to as an antenna) and a diplexer 108 for outputting signals by discriminating between signals of different frequency bands. Particularly, according to this preferred present invention, a switch section 106 is provided between the antenna 102 and the diplexer 108. The switch section 106 may disconnect the antenna 102 and the diplexer 108, and may connect a satellite antenna 104 to the diplexer 108 when the satellite antenna 104 is mounted on the mobile communication terminal 100. In addition, the diplexer 108 is connected to the receiving/transmitting signal processing section 110 for processing transmitting/receiving signals.

When the satellite antenna 104 is not mounted or installed on the mobile communication terminal 100, signals received by or transmitted from the antenna 102 are inputted/outputted to/from a first frequency band processing section 112 for processing general call signals and a second frequency band processing section 114 for processing public broadcasting/satellite broadcasting signals via the diplexer 108. When the mobile communication terminal 100 operated as mentioned above is equipped with the satellite antenna 104, the switch section 106 switches to connect the diplexer 108 and the satellite antenna 104 installed in the mobile communication terminal 100. Thus, if the satellite antenna 104 is connected to the diplexer 108 through the switch section 106, a connection between the diplexer 108 and the antenna 102 is disconnected so that signals are received in the mobile communication terminal 100 only through the satellite antenna 104. Accordingly, in order to facilitate general communication, such as voice communication or message communication, by the mobile communication terminal 100, the satellite antenna 104 must be equipped with functions capable of receiving not only frequency bands of the broadcasting service, but also general communication frequency bands.

FIG. 2 shows an external antenna mounted on a mobile communication terminal 200 according to a second embodiment of the present invention. The mobile communication terminal 200 according to the second embodiment of the present invention is a dual band type mobile communication terminal having a sender/receiver antenna 202 (hereinafter, simply referred to as an antenna) and a diversity antenna 210 capable of simultaneously operating two different systems.

That is, the mobile communication terminal 200 has the antenna 202, the diversity antenna 210 for a diversity function and a diplexer 204 connected to the antenna 202 in order to output signals transmitted from the diversity antenna 210 according to frequency bands thereof. In addition, a receiving/transmitting signal processing section 214 is provided to process signals received or transmitted through the antenna 202, the diversity antenna 210 and a satellite antenna 216. Particularly, according to the present invention, a switch section 212 is provided to connect to the satellite antenna 216, which is detachably installed on the mobile communication terminal. The switch section 212 is positioned between the diversity antenna 210 and the receiving/transmitting signal processing section 214. When the satellite antenna 216 is not installed on the mobile communication terminal 200, the diversity antenna 210 is connected to the receiving/transmitting signal processing section 214 through the switch section 212. In contrast, if the satellite antenna 216 is installed on the mobile communication terminal 200, the satellite antenna 216 is connected to the receiving/transmitting signal processing section 214 through the switch section 212. Therefore, the antenna 202 for a general communication function of the mobile communication terminal 200 may perform its original function even if the satellite antenna 216 is installed on the mobile communication terminal 200.

FIG. 3 shows an external antenna mounted on a mobile communication terminal 300 according to a third embodiment of the present invention.

The mobile communication terminal 300 includes a sender/receiver antenna 302 (hereinafter, simply referred to as an antenna) for receiving/transmitting signals for general call communication and a diplexer 304. The diplexer 304 is connected to a receiving/transmitting signal processing section 306 for processing transmitting/receiving signals. In addition, according to the third embodiment of the present invention, a switch section 310 is provided between the diplexer 304 and the receiving/transmitting signal processing section 306 to connect to a satellite antenna 312 installed on the mobile communication terminal 300. If the satellite antenna 312 is not installed on the mobile communication terminal 300, the diplexer 304 is connected to the receiving/transmitting signal processing section 306 by means of the switch section 310. In contrast, if the satellite antenna 312 is installed on the mobile communication terminal 300, the satellite antenna 312 is connected to the receiving/transmitting signal processing section 306 by means of the switch section 310. If the satellite antenna 312 is installed on the mobile communication terminal 300, the antenna 302 continuously receives/transmits signals of general call frequency bands to provide general call communication. At the same time, the mobile communication terminal 300 may receive broadcasting communication signals from the satellite antenna 312 in frequency bands for public broadcasting/satellite broadcasting service, via the second frequency band processing section 308.

As described above, the mobile communication terminal according to the present invention has a switch section at a front of the receiving/transmitting signal processing section. Further, first and second antennas can be detachably coupled via a switching port on the mobile communication terminal and connected by the switch section. The switching port can be positioned at a rear end of the first antenna. The switching port can also be positioned at a front end of the signal receiving/transmitting section.

In addition, if a user wants to receive satellite signals, such as multimedia public broadcasting signals or DMB signals, through the mobile communication terminal, the user can additionally mount the satellite antenna on the mobile communication terminal. When the satellite antenna is additionally mounted on the mobile communication terminal, the mobile communication terminal may receive not only multimedia broadcasting signals, but also general call signals for basic communication.

While the present invention has been shown and described with reference to certain preferred embodiments thereof, it will be understood by those skilled in the art that various changes in form and details may be made therein without departing from the spirit and scope of the invention as defined by the appended claims. For example, although the present invention is described with reference to the dual band type mobile communication terminal, the present invention is applicable to a multi-band type mobile communication terminal.

What is claimed is:

1. A mobile communication terminal comprising:
   a sender/receiver antenna;
   a diplexer connected to the sender/receiver antenna for outputting signals received by the sender/receiver antenna by discriminating between signals of different frequency bands;
   a satellite antenna detachably mounted on the mobile communication terminal to receive multimedia public broadcasting signals and satellite broadcasting signals;
   a receiving/transmitting signal processing section for processing signals transmitted thereto from the sender/receiver antenna or the satellite antenna; and
   a switch section for connecting the diplexer to the sender/receiver antenna when the satellite antenna is not mounted on the mobile communication terminal and connecting the satellite antenna to the diplexer when the satellite antenna is mounted on the mobile communication terminal.

2. A mobile communication terminal comprising:
   a sender/receiver antenna;
   a diversity antenna for performing a diversity function;
   a diplexer connected to the sender/receiver antenna for outputting signals received by the sender/receiver antenna by discriminating between signals of different frequency bands;
   a satellite antenna detachably mounted on the mobile communication terminal to receive multimedia public broadcasting signals and satellite broadcasting signals;
   a receiving/transmitting signal processing section for processing signals transmitted thereto from the sender/receiver antenna, the diversity antenna and the satellite antenna; and
   a switch section for connecting the diversity antenna and the receiving/transmitting signal processing section when the satellite antenna is not mounted on the mobile communication terminal and connecting the satellite antenna to the receiving/transmitting signal processing section when the satellite antenna is mounted on the mobile communication terminal.

3. A mobile communication terminal comprising:
   a sender/receiver antenna;
   a diplexer connected to the sender/receiver antenna for outputting signals received by the sender/receiver antenna by discriminating between signals of different frequency bands;
   a satellite antenna detachably mounted on the mobile communication terminal to receive multimedia public broadcasting signals and satellite broadcasting signals;
   a receiving/transmitting signal processing section for processing signals transmitted thereto from the sender/receiver antenna and the satellite antenna; and
   a switch section for connecting the diplexer and the receiving/transmitting signal processing section when the satellite antenna is not mounted on the mobile communication terminal and connecting the satellite antenna to the receiving/transmitting signal processing section when the satellite antenna is mounted on the mobile communication terminal.

4. The mobile communication terminal as claimed in claim 3, wherein, when the satellite antenna is mounted on the mobile communication terminal, the mobile communication terminal receives satellite signals through the satellite antenna and receives call signals through the sender/receiver antenna.

5. A mobile communication terminal comprising:
   a signal receiving/transmitting section operating with at least two frequency bands;
   a first antenna;
   a second antenna detachably mounted on the mobile communication terminal;
   a diplexer connected to the first antenna for outputting signals received by the first antenna by discriminating between signals of different frequency bands; and
   a switching port for connecting the diplexer to the first antenna when the second antenna is not mounted on the mobile communication terminal and connecting the second antenna to the diplexer when the second antenna is mounted on the mobile communication terminal.

6. The mobile communication terminal as claimed in claim 5, wherein the switching port is positioned at a rear end of the first antenna.

7. The mobile communication terminal as claimed in claim 5, wherein the switching port is positioned at a front end of the signal receiving/transmitting section.

8. The mobile communication terminal as claimed in claim 5, further comprising a diversity antenna adaptable for a specific band of one of at least two frequency bands, wherein the switching port is positioned at a rear end of the diversity antenna.

9. The mobile communication terminal as claimed in claim 5, wherein the second antenna is dedicated for receiving satellite broadcasting signals.

10. The mobile communication terminal as claimed in claim 6, wherein the second antenna is dedicated for receiving satellite broadcasting signals.

11. The mobile communication terminal as claimed in claim 7, wherein the second antenna is dedicated for receiving satellite broadcasting signals.

12. The mobile communication terminal as claimed in claim 8, wherein the second antenna is dedicated for receiving satellite broadcasting signals.

* * * * *